(12) United States Patent
Gregor et al.

(10) Patent No.: US 7,980,479 B2
(45) Date of Patent: Jul. 19, 2011

(54) DATA STORAGE CARD AND INSERT STRUCTURE

(76) Inventors: Brett Gregor, Newport Beach, CA (US); David Francis McGregor Bain, Ottawa (CA); Harry Edward Morgan, Tucson, AZ (US)

( * ) Notice: Subject to any disclaimer, the term of this patent is extended or adjusted under 35 U.S.C. 154(b) by 348 days.

(21) Appl. No.: 12/144,479

(22) Filed: Jun. 23, 2008

(65) Prior Publication Data

US 2009/0314843 A1 Dec. 24, 2009

(51) Int. Cl.
*G06K 19/06* (2006.01)
(52) U.S. Cl. ......... 235/493; 235/492; 235/380; 235/451
(58) Field of Classification Search .............. 235/493, 235/380, 451, 487, 492, 449, 351
See application file for complete search history.

(56) References Cited

U.S. PATENT DOCUMENTS

| | | | |
|---|---|---|---|
| 6,969,006 B1 * | 11/2005 | Smith, Sr. ................. | 235/487 |
| 2003/0111539 A1 * | 6/2003 | Cheung .................... | 235/487 |
| 2003/0132300 A1 * | 7/2003 | Dilday et al. ............. | 235/487 |
| 2008/0308641 A1 * | 12/2008 | Finn ......................... | 235/492 |

\* cited by examiner

*Primary Examiner* — Edwyn Labaze
(74) *Attorney, Agent, or Firm* — Larry K. Roberts

(57) ABSTRACT

A data storage card has an optical data storage region and a magnetic data storage region, and is adapted to cooperatively engage both a drive mechanism of a magnetic stripe reader and a rotatable drive mechanism of an optical data reader. An exemplary embodiment of the card includes a card body defining first and second opposed generally planar surfaces, with an aperture formed in the card body. An annular optical data region centered on the aperture is disposed on one of the first and second surfaces of the card body. At least one magnetic linear data region is disposed on at least one of the first and second surfaces. The card includes an insert structure disposed in the aperture, and configured to engage with the rotatable drive mechanism of the optical data reader in an optical data reading mode, and to engage rollers of the magnetic stripe reader in a magnetic data reading mode. In an exemplary embodiment, the insert structure is a unitary structure fabricated of an elastic material.

28 Claims, 8 Drawing Sheets

DATA STORAGE CARD AND INSERT STRUCTURE

BACKGROUND

By the early 1970's, credit cards had come to the marketplace as a form of convenient, cashless payment. Since that time, the physical form factor of credit cards has changed very little.

U.S. Pat. Nos. 6,484,940 and 7,080,783, the entire contents of which are incorporated herein by this reference, describe data storage cards which have optical and magnetic data storage regions, and may be engaged both by a drive mechanism of a magnetic stripe reader and a drive mechanism of an optical data reader.

DETAILED DESCRIPTION

Figure 1A:
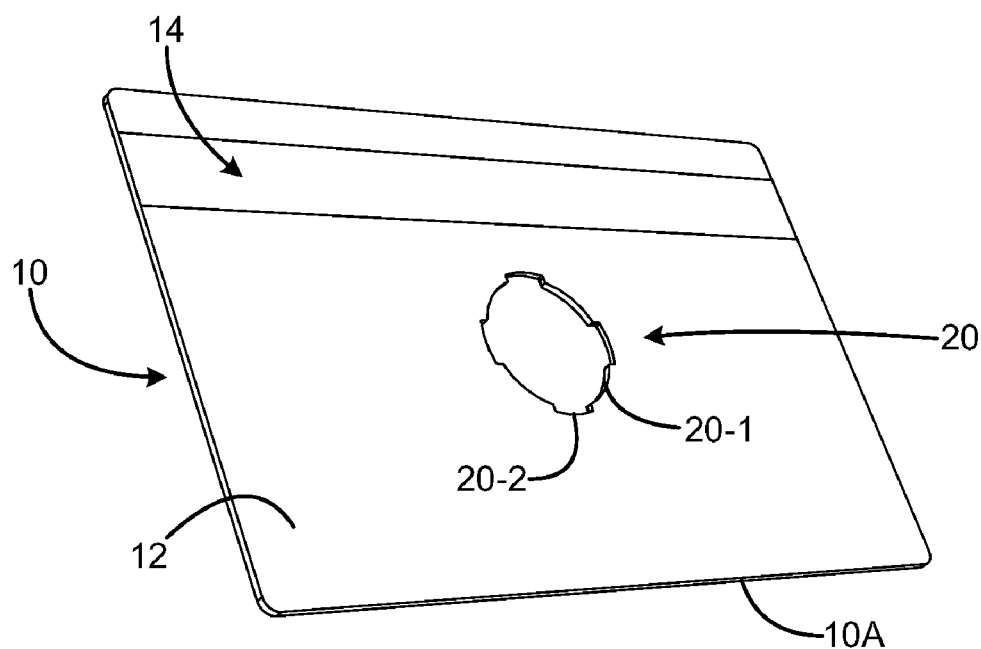
FIG. 1A is a front isometric view of an exemplary embodiment of a data storage card with a center opening, adapted for installation of a disk insert, with a magnetic data storage region.

In the following detailed description and in the several figures of the drawing, like elements are identified with like reference numerals. The figures may not be to scale, and relative feature sizes may be exaggerated for illustrative purposes.

An exemplary embodiment of the subject matter described herein provides a data storage card, e.g., a credit or debit card, that would have all the normal, functioning attributes of a credit card (rectangular, industry-standard shape; thinness; magnetic stripe; printing/labeling), yet also be able to work in an optical media drive such as that of a personal computer, and have a data region on the credit card that can be recognized and read by standard optical media drives (i.e. CD, DVD, etc.).

In order for a data storage card, e.g., one having the overall form factor of an industry-standard credit card, to function in a standard optical media drive, the card has an opening or aperture, e.g., a 15 mm hole, in the center of the card. This aperture allows the spindle mechanism of an optical media drive of a laptop optical drive, or the spindle/cone mechanism of a standard tray-based optical media drive, to be able to clasp and spin-up the optical media, so that the optical media data region can be read by the optical media drives laser mechanism. However, if a credit card with a 15 mm aperture is placed into the card reader of a standard ATM machine ("automated teller machine"), the pin-rollers inside the ATM drive mechanism that drive the card in to the unit will cross the open area of the hole, and thus not be able to further drive the card in to the ATM reading mechanism.

An exemplary embodiment of a data storage card configured to be read by magnetic readers and by optical media drives may include an insert structure attached to the card at the optical drive opening. The insert structure may provide one or more of the following features:

- be a permanent, durable part of the data storage card;
- allow functioning in snap-on-spindle and spindle/cone type optical media drives;
- allowing functioning in single and dual pin-roller ATM machines;
- not create any additional thickness to the standard credit card thickness;
- allow manufacturing capabilities to be applied to the data storage card in a high-speed manner.

An exemplary embodiment of an optical disk insert (ODI) has no moving parts, is durable, and may be as thin, or thinner, than the thickness of the card at the optical media opening. The data card with the ODI may be cooperatively configured to operate in the drive mechanisms of ATMs, and in the drive mechanisms of optical media drives, preferably both drives with tray and spindle, and those with fixed spindle (laptops). An exemplary embodiment of the data card with the ODI may be configured to conform to a standard credit card form factor, in flatness and thinness, and provide a durable, one piece device, which does not require assembly/disassembly by consumer.

An exemplary embodiment of the ODI includes structural features that extend across the opening, and includes an ODI open center area to accommodate optical drive spindles with alignment crown/pins. In an exemplary embodiment, the ODI is elastic, and may be constructed with ripples, to support stretching and elongation.

An exemplary embodiment of a data card with an ODI is a configuration in which the optical media portion of the data card is characterized by a bottom or underside, in which the laser first enters the optical media. In this exemplary embodiment, the data card may be notched completely through the thickness of the data card around the opening in the card. The card may have a depression or clearance region defined in the bottom surface of the card around the center opening, facilitating attachment of the ODI and allowing settling of ODI when not stretched. The notches or relieved areas formed around the opening of the card allow the ODI to be urged or stretched upwardly by the optical media drive spindle while still preserving the diameter dimension of the card opening.

Figure 1B:
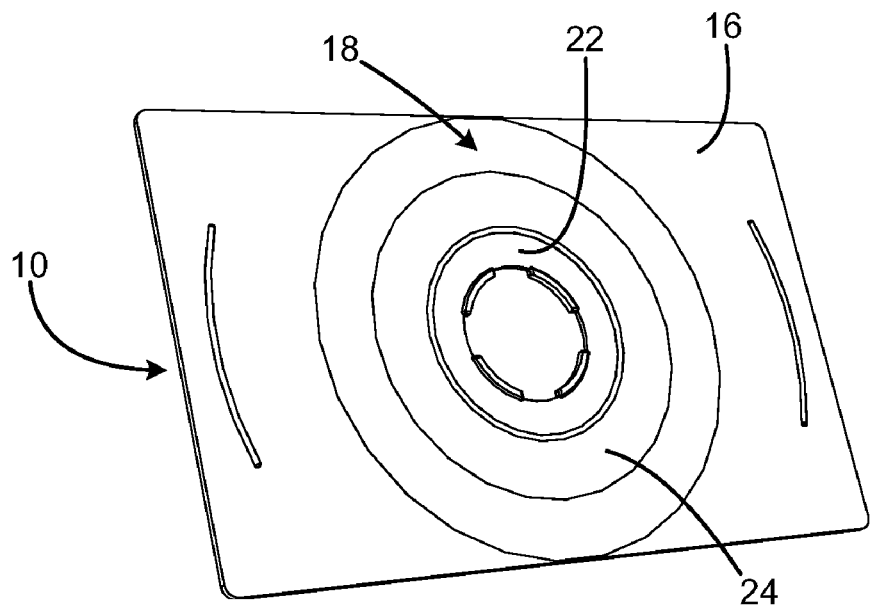
FIG. 1B is a back isometric view of the data storage card of FIG. 1A, illustrating an optical data storage region.

FIGS. 1A-1B illustrate exemplary features of an exemplary embodiment of a data card 10 which is "ODI-ready" but without an installed ODI. The data card 10 in this embodiment is rectangular, with generally planar opposed surfaces 12 and 16. The length, width and thickness of the card 10 may be those of a standard sized credit or ATM data card, e.g., nominally 85.6 mm by 54 mm by 0.76 mm, ±10% for an ISO 7816 format card, also known as the CR80 format. The card 10 has a magnetic data storage region 14 on the first side 12, which in this embodiment is a linear stripe 14. The opposite side 16 of the card has formed thereon an optical data region 18, which is an annular region. The optical data region 18 is encoded with data, in a form suitable for reading by an optical disk data drive.

An opening 20 is centrally located in the card 10, and in this exemplary embodiment has a 15 mm diameter, selected for engagement with standard optical disk drives. In this exemplary embodiment, the opening 20 is not defined by a smooth circle, but has notches or relieved portions spaced about the periphery of the opening. Thus, the opening 20 has arc-shaped portions 20-1 separated by notches 20-2, in this example on 90 degree spacing. The notches may be arc-shaped as well but on a larger diameter.

The surface 16 of the card 10 in an exemplary embodiment has a recessed annular region 22 surrounding the opening 20. In an exemplary embodiment, the card 10 has a general thickness of 0.95 mm over an area outside the region 22, and the card thickness in region 22 is 0.5 mm. For this exemplary embodiment, for the case in which the optical data region 18 has an inner diameter of 32 mm, the annular region 22 has an outer diameter of 25 mm. In other embodiments, the outer diameter of annular region 22 may smaller or larger. Another annular region 24 separates the region 22 from the optical data region 18. In an exemplary embodiment, the opposed surface 12 is not recessed in an area surrounding the opening. The recessed region 22 provides a mounting surface to attach an ODI 30.

FIG. 1C illustrates an alternate embodiment of the data card 10 with a circular opening 20 and the recessed annular region 22 surrounding the opening. In this embodiment, the opening 20 is not provided with the notches as in the embodiment of FIGS. 1A-1B.

Referring now to FIGS. 2A-2D, the data card 10 is illustrated with an exemplary embodiment of an ODI 30 installed at the center opening 20 of the card. The ODI is fabricated of an elastic material, such as a thermo plastic elastomer (TPU) or a thermo plastic urethane (TPU). Of course, other suitable elastic materials may also be used.

Figure 3A:
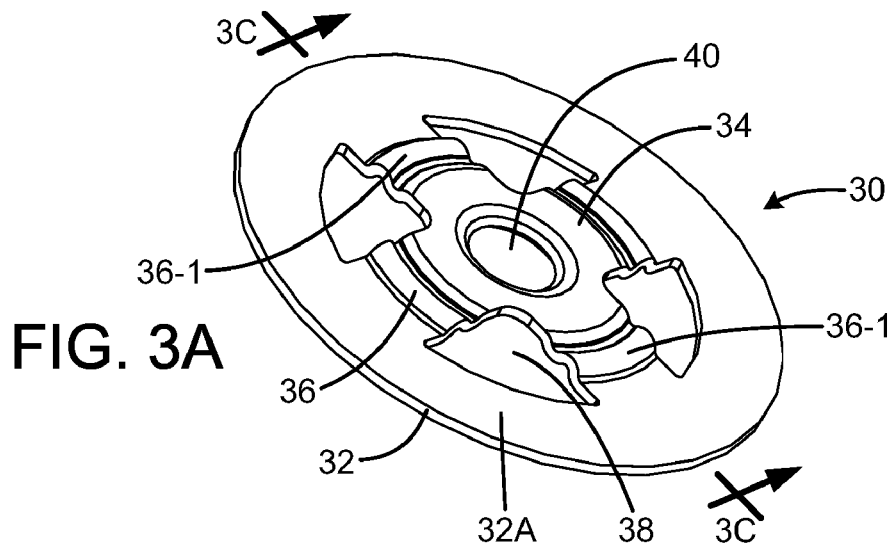
FIG. 3A, 3B and 3C are respective front, back and cutaway isometric views of an exemplary embodiment of an optical disk insert structure.
Figure 3B:
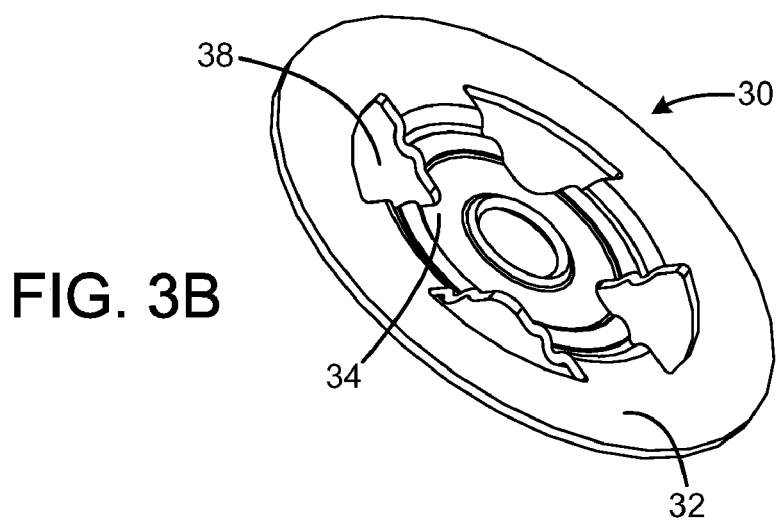
Figure 3C:
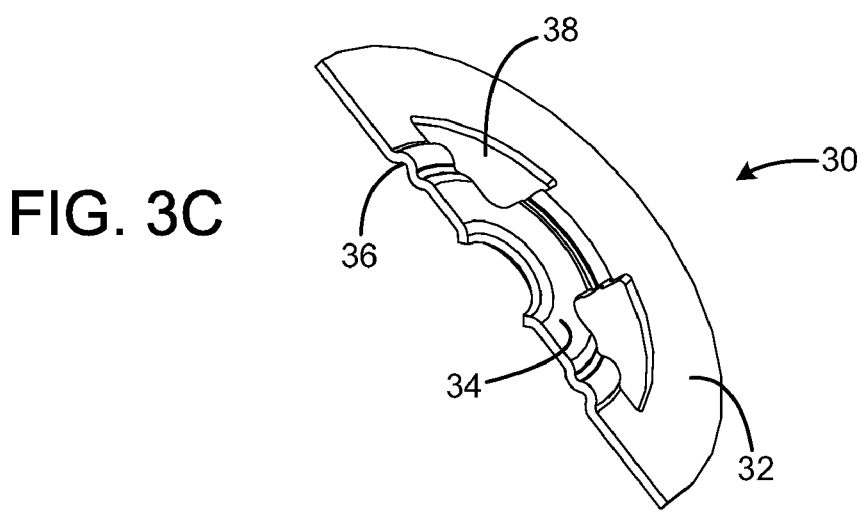

An exemplary embodiment of the ODI 30 in isolation is depicted in FIGS. 3A-3C. The ODI includes a generally annular outer peripheral portion 32, and an inner ring portion 34 joined to the outer peripheral portion by web portions 36. In this embodiment, there are four web portions arranged at generally equal spacing about the center opening 40 of the ODI, with openings 38 defined in the ODI between the web portions, the ring portion and the annular outer peripheral portion 32. The center opening accommodates an alignment pin or center cone in an optical disk drive. The web portions include web portions 36-1 and 36-2 generally aligned along the longitudinal center axis of the card 10. In an exemplary embodiment, the center opening 40 has a diameter of 3 mm, the ODI has an outer diameter of 35 mm, the outer diameter of the ring portion 34 is 10 mm, and the web portions have a width of 5 mm to essentially match, or be somewhat small in width than the notches 20-2 formed in the data card body at the center opening 20. The ODI in this example has a thickness of 0.5 mm.

While the exemplary embodiment of the ODI 30 has four web portions, it will be appreciated that other ODI configurations may also be employed, e.g. with two, three, six or more web portions. Preferably, the ODI provides sufficient structure extending along the path of the ATM drive rollers to maintain sufficient contact with the rollers as the roller pass over the aperture 20 that the roller continue to impart drive forces to pull the card 10 into and out of the ATM reader during its operation. If the material of the ODI is sufficiently elastic, the web portion between the ring portion 34 and the outer peripheral portion may be a continuous layer of material, i.e. without openings 38, to form a diaphragm with a hole 40 in its center.

Figure 2A:
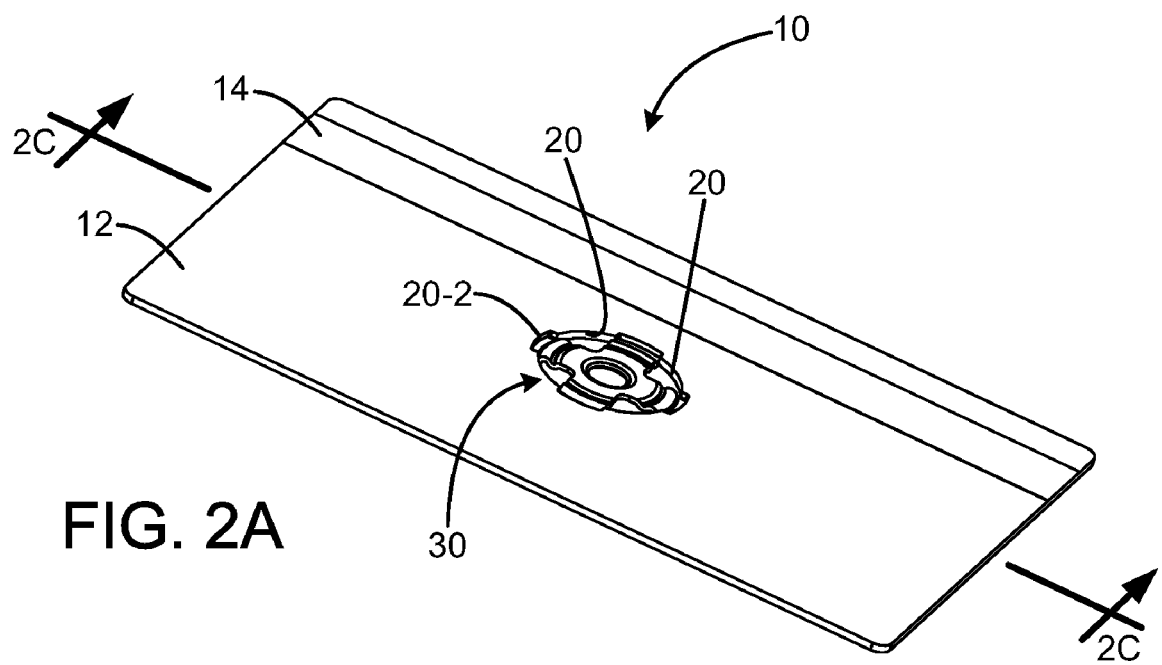
FIG. 2A is a front isometric view of an exemplary embodiment of a data storage card as in FIG. 1A, with a disk insert installed in the center opening.
Figure 2B:
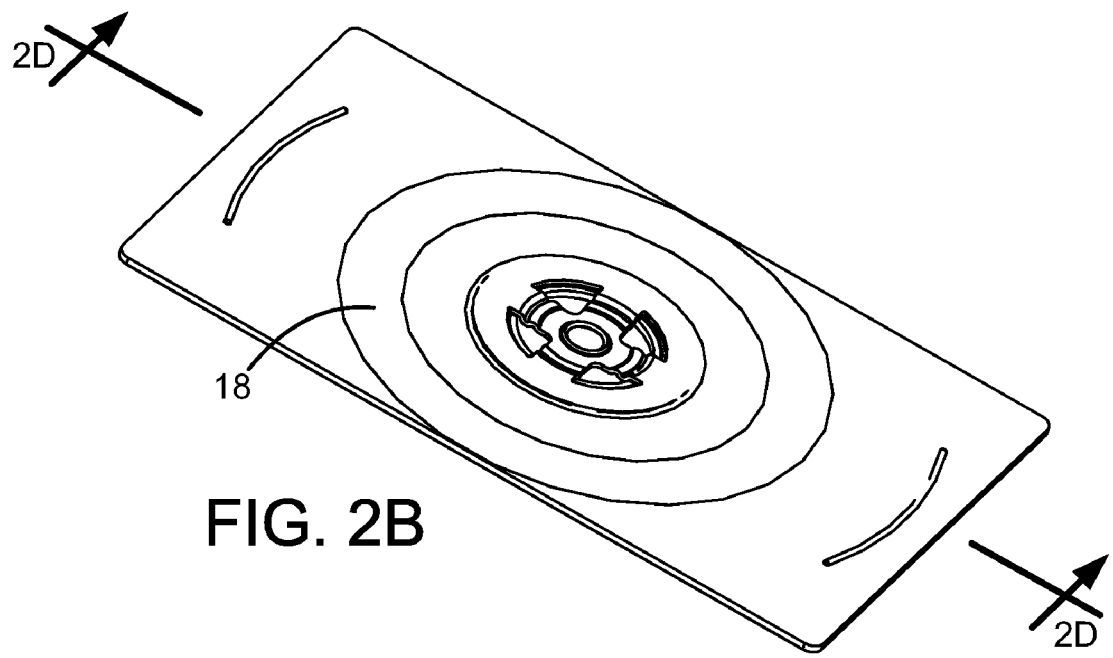
FIG. 2B is a back isometric view of the data storage card of FIG. 2A.
Figure 2C:
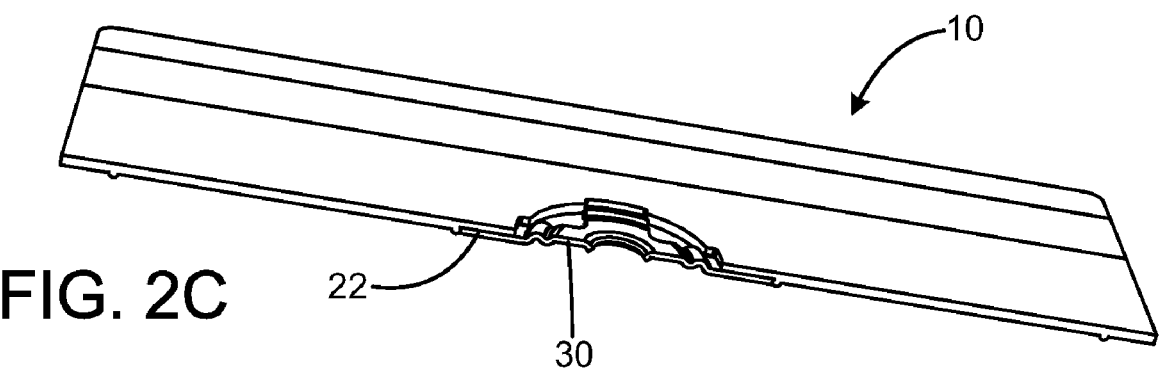
FIG. 2C is an isometric cutaway view, taken along line 2C-2C of FIG. 2A.
Figure 2D:
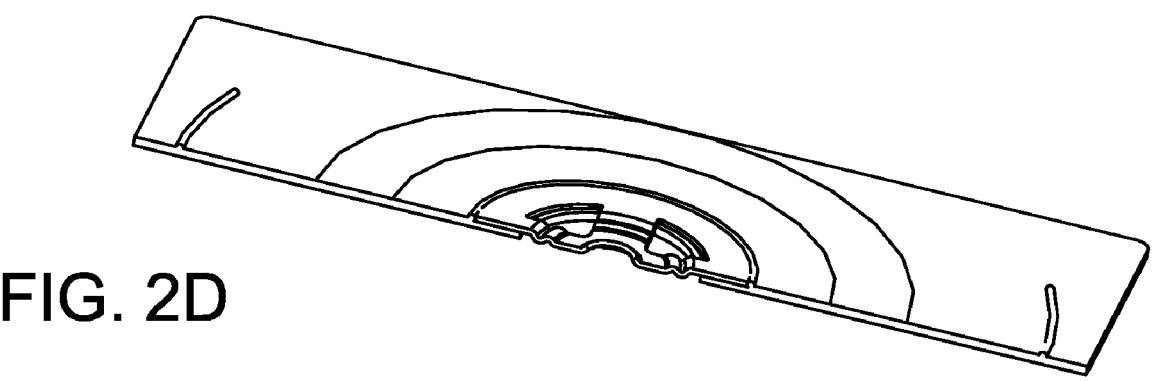
FIG. 2D is an isometric cutaway view, taken along line 2D-2D of FIG. 2B.

The ODI may be attached to the data card body 10A, by adhering a top surface 32A (FIG. 3A) of the outer annular portion 32 to the data card body at recessed surface 22. This is depicted in FIGS. 2C and 2D. An exemplary adhesive suitable for the purpose is a pressure sensitive acrylic adhesive, although other adhesives may also be employed. The ODI is positioned in a rotational sense about the center opening 20 such that the web portions 36 are positioned at corresponding notches 20-2 formed in the data card body. The notches permit greater elongation travel of the ring portion 34 when the data card is positioned on a spindle of an optical media reader.

The ODI may be fabricated as a separate unit from the data card body, e.g. by cavity molding. The ODI may also be molded in place with the data card, e.g. by over-molding techniques. The data card with an ODI may be fabricated by various techniques, in which the ODI is attached to the card by in-line adhesion in which the card is fabricated and the ODI is applied in the same production line or process, or post construction adhesion using an adhesive.

Figure 4A:
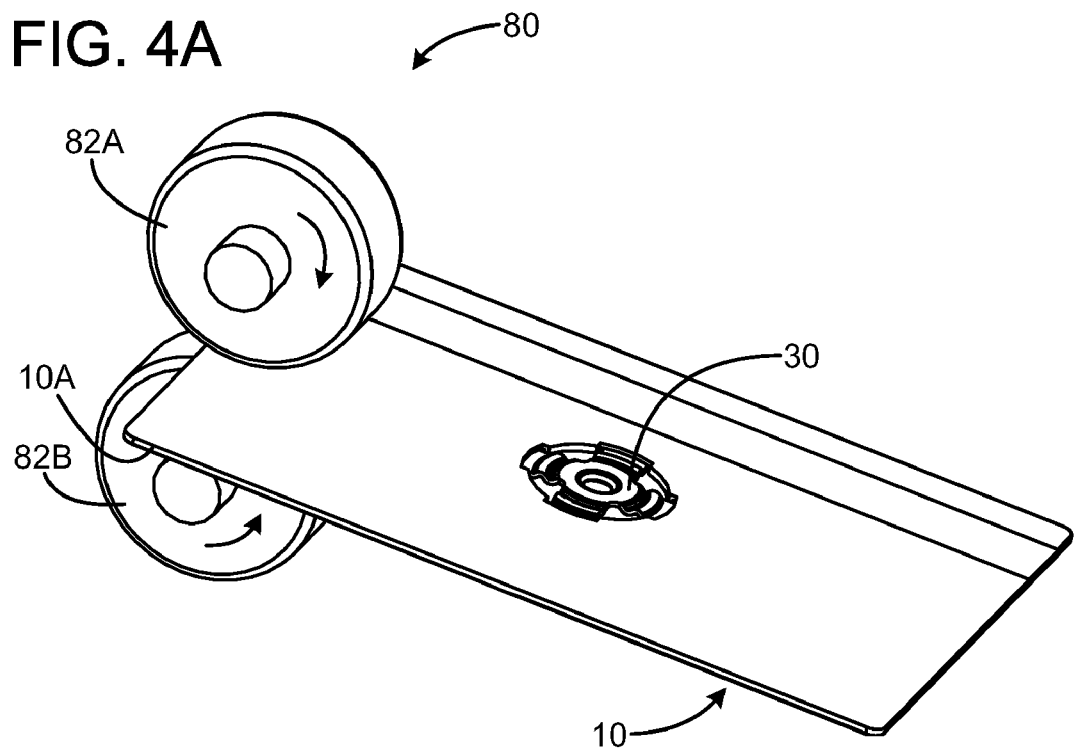
FIG. 4A is an isometric diagrammatic view of an exemplary embodiment of a data storage card entering the nip between rollers of an ATM card reader.
Figure 4B:
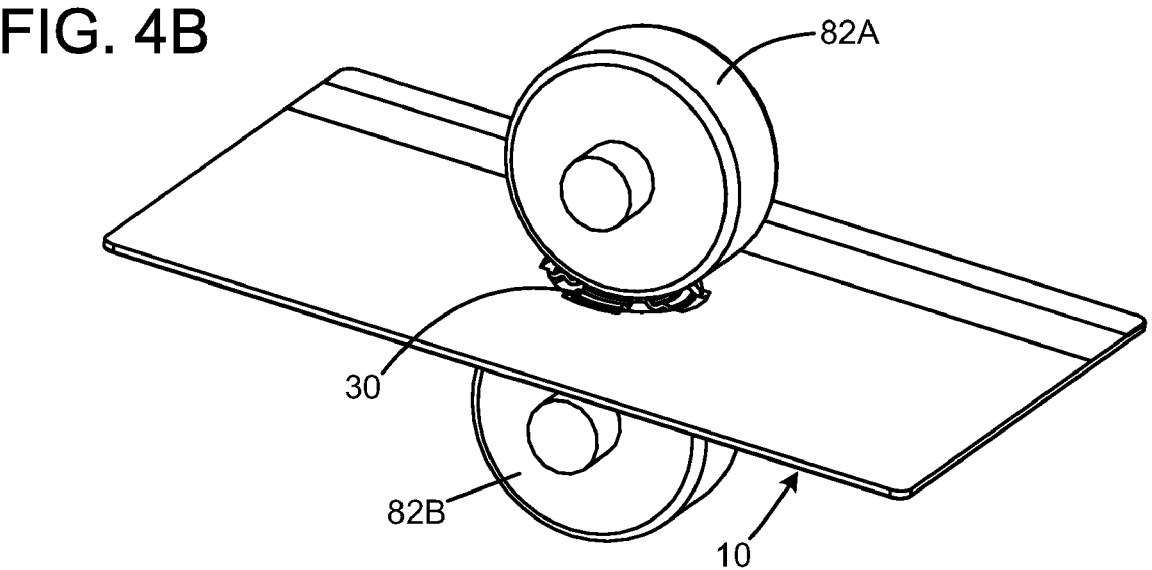
FIG. 4B is an isometric diagrammatic view similar to FIG. 4A, but showing the card pulled through the nip of the ATM reader rollers to the optical disk insert structure.

The ODI 30 provides a data card structure which is engagable by the pin rollers of an ATM card reader, and which also permits the data card to be engaged by a spindle of an optical media drive. FIGS. 4A and 4B illustrate diagrammatically a data card 10 with an ODI 30 being fed into the nip between pin rollers 82A and 82B of an ATM card reader 80. As the rollers are rotated in the directions illustrated by the arrows in FIG. 4A, the rollers engage the card body 10A, and pull the card into the card reader. As the rollers continue to rotate, the data card 10 is drawn forward, with the ODI 30 being contacted and engaged between the roller nip, as shown in FIG. 4B. The ODI 30 has sufficient thickness that the rollers engage the ODI, continuing to pull the card into the card reader, such that data card body 10A is again contacted by the rollers. The magnetic data region may be read by the card reader, in the standard manner. The card may be ejected from the card reader by reversing the direction of rotation of the rollers.

Figure 5A:
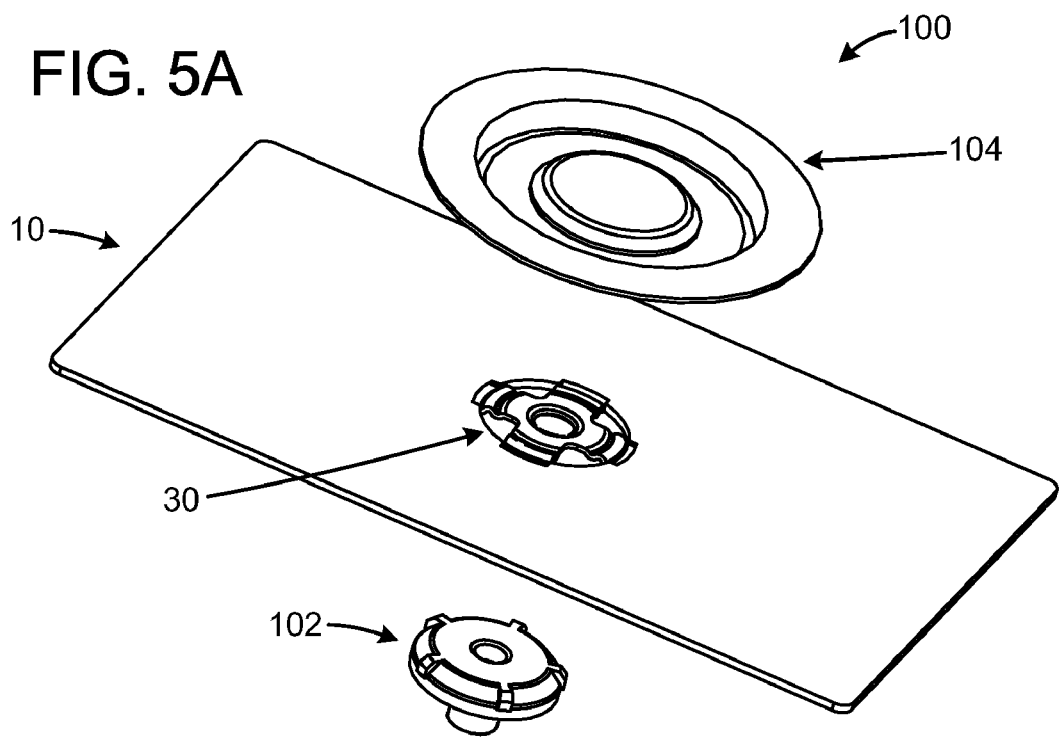
FIGS. 5A-5B are respective top and bottom diagrammatic isometric exploded view illustrating an exemplary embodiment of a data storage card and elements of an optical disk drive with a tray and spindle.
Figure 5B:
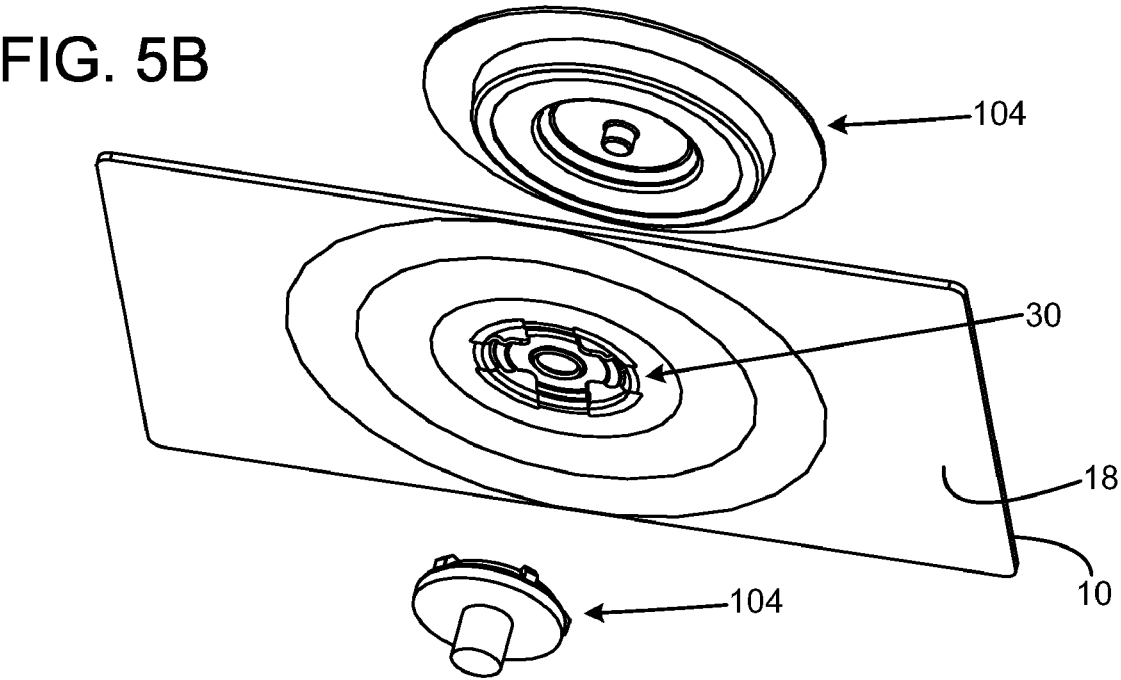

FIGS. 5A-5B diagrammatically illustrate an exemplary spindle cone mechanism of a standard tray-based optical media drive 100, with spindle cone 102 and clamp 104. The data card 10 with ODI 30 is configured to be clasped between the spindle cone and the clamp, and spun-up by the motor drive unit of the optical media drive, so the optical media data region 18 (FIG. 5B) can be read by the optical media drive laser mechanism. The ODI 30 is sufficiently elastic, to elongate in a direction transverse to the plane of the data card body, to allow the spindle cone and clamp to center and secure the data card in proper position.

Figure 6:
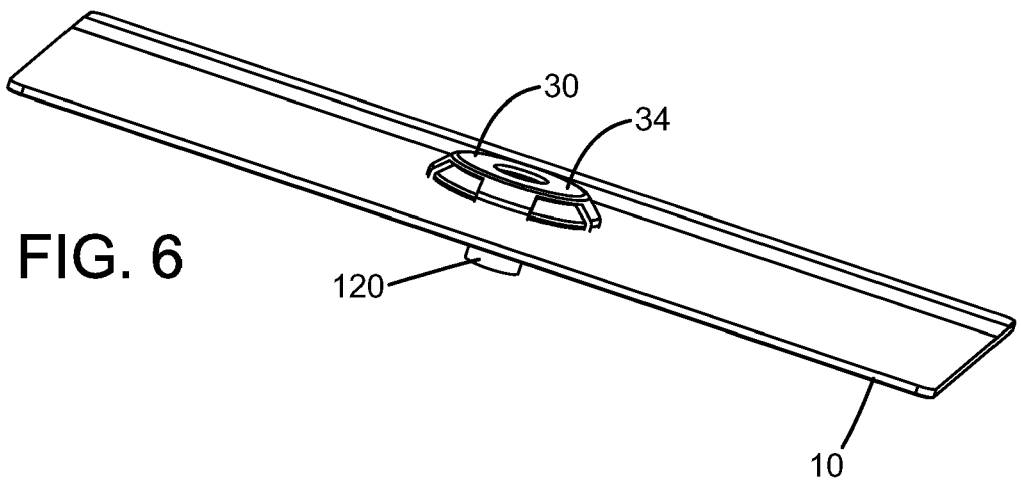
FIG. 6 is a diagrammatic isometric view of a data storage card with its center opening and optical disk insert engaged by a fixed spindle, optical disk drive.

The data card with an ODI may also be configured for use in a fixed spindle optical media drive, such as a laptop-type drive unit. FIG. 6 diagrammatically depicts such an optical media drive, which includes a spindle 120. The data card 10 has been pushed onto the spindle, so that the spindle is engaged with the ODI 30. The engagement has resulted in the ring portion 34 of the ODI being displaced in a direction transverse to the plane of the data card, with the ODI elastically stretching or deforming to accommodate the displacement. After the data card is removed from the optical drive, the ODI 30 will conform to, or resume, its generally planar condition, as depicted in FIG. 2C, for example.

The exemplary embodiments of the data card illustrated in FIGS. 1A-6 attach the ODI to the bottom surface of the data card, and provide notches in the card opening to accommodate the ODI material thickness when installed in an optical drive and deformed or stretched upwardly by the disk drive to preserve the diameter of the opening, e.g. 15 mm. Alternatively, the data card may have an annular recess formed in the top surface, and the ODI attached to the top surface of the data card. In this embodiment, the card opening may be formed as a circle, i.e. without the notches or relieved areas of the data card of FIGS. 1A-6. Such an alternate embodiment is illustrated in FIGS. 7A and 7B.

Figure 7A:
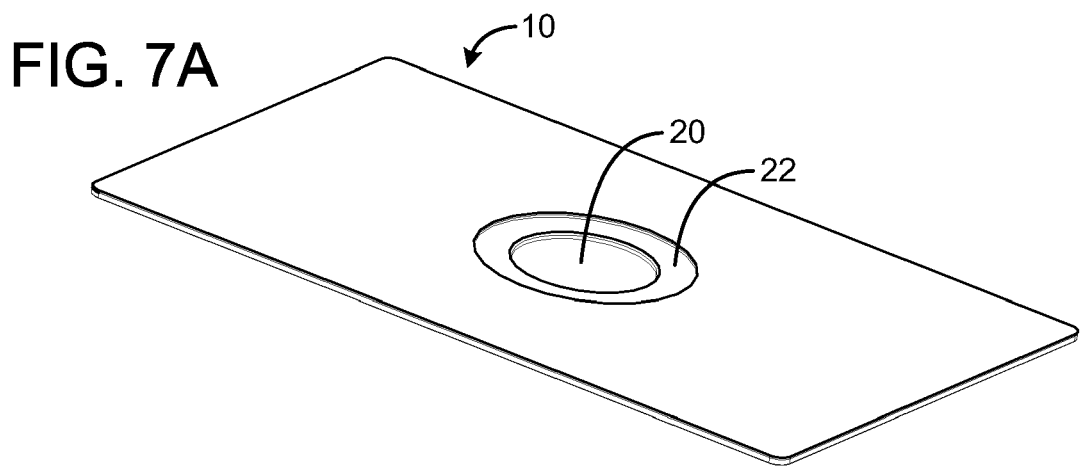
FIG. 7A is a back isometric view of an alternate exemplary embodiment of a data storage card, illustrating a center opening with a surrounding recessed area for top side attachment of an optical disk insert structure.
Figure 7B:
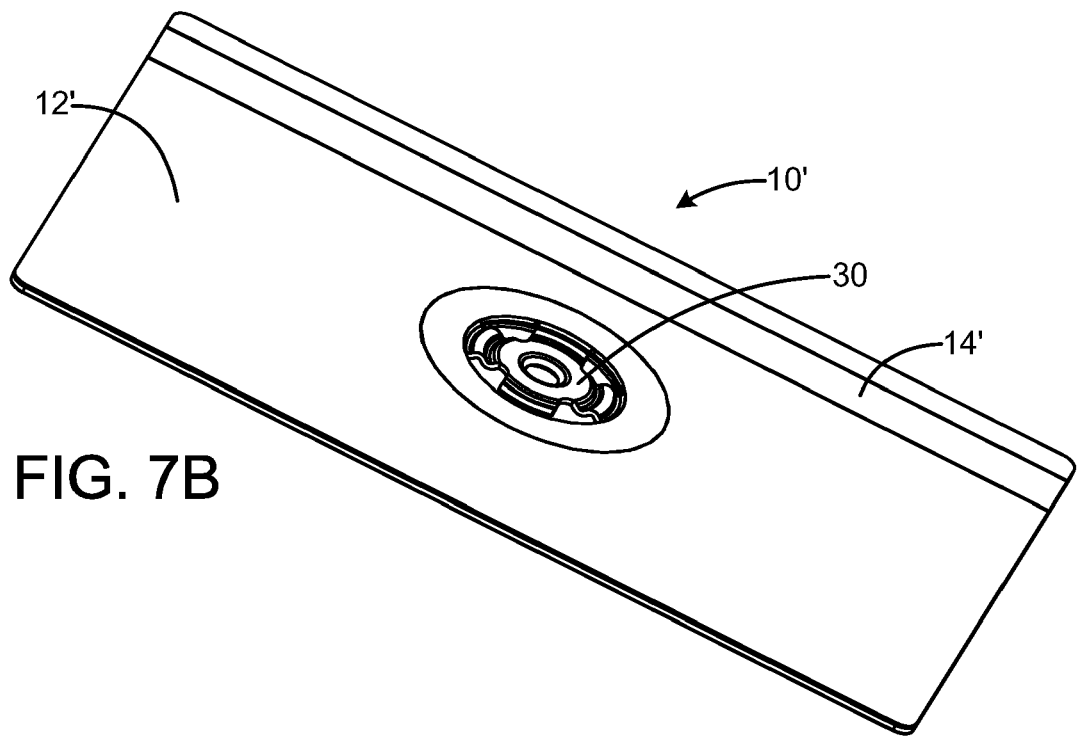
FIG. 7B is an isometric view of the data card of FIG. 7A with an optical disk insert structure attached to the data card.

An "ODI ready" data card 10' is illustrated in FIG. 7A. The top surface 12' of the card has a magnetic data strip 14' arranged along a longitudinal edge, and an opening 20' as with the embodiment of FIG. 1A. In this alternate embodiment, the card has an annular recess 22' formed in the top surface for attachment of an ODI 30. FIG. 7B shows an ODI 30 attached to the data card 10' on its top surface 12'.

Figure 8A:
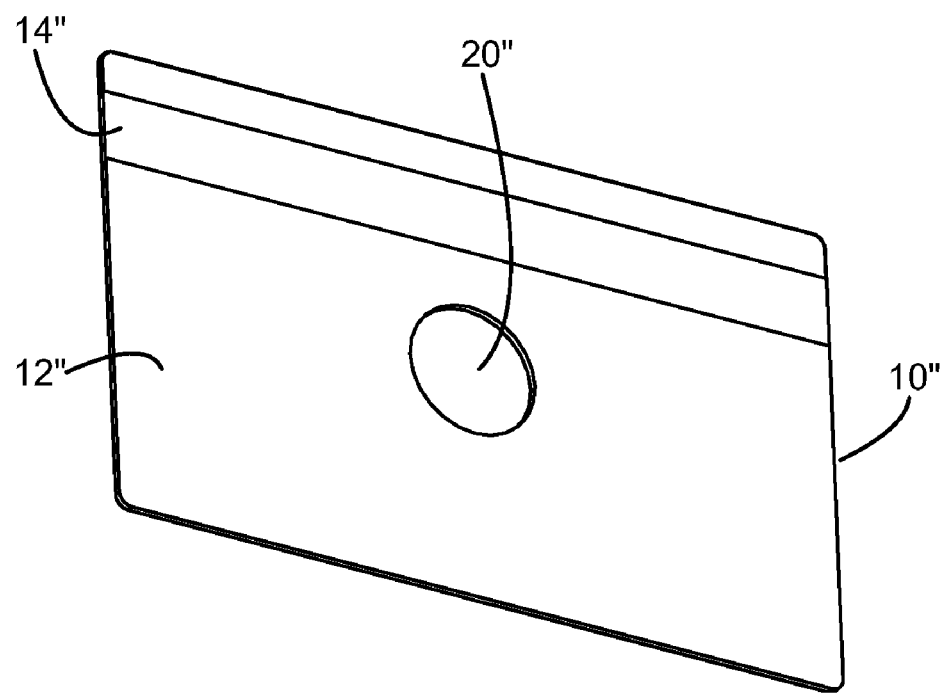
FIGS. 8A and 8B are respective front and back isometric views of an alternate embodiment of a data storage card with a center opening, for top or bottom side attachment of an optical disk insert structure.
Figure 8B:
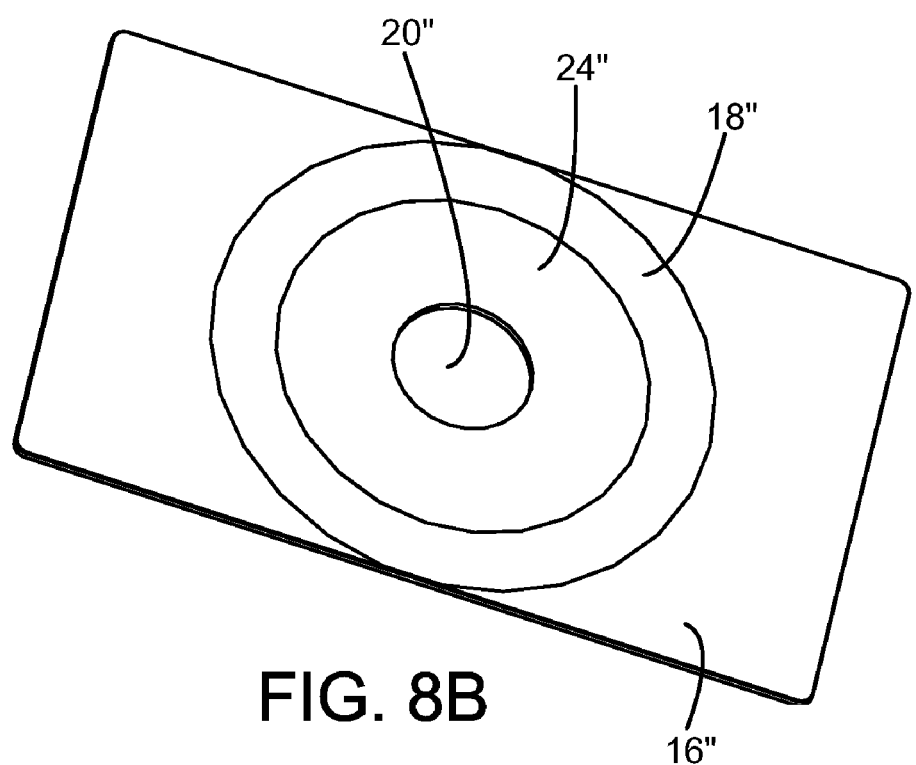

FIGS. 8A and 8B depict another embodiment of an "ODI-ready" data card 10". The top surface 12" of the card has a magnetic data strip 14" arranged along a longitudinal edge, and an opening 20" as with the embodiments of FIG. 1A and 7A. The bottom surface 16" is visible in FIG. 8B, which also depicts the annular region 24" and optical data region 18". In contrast to the embodiments of FIGS. 1A-1B and 7A-7B, the data card 10" is not formed with a recess as an attachment surface for the ODI, nor is the opening 20 notched along its periphery. The thickness of the card 10" may be reduced so that the ODI is attached to the top or bottom surface of the card in an annular region surrounding the opening 20" and the combined thickness of the card and ODI does not exceed the nominal thickness of an optical or magnetic data card, so that the card and ODI assembly may be read by a magnetic card reader and an optical media drive.

Although the foregoing has been a description and illustration of specific embodiments of the subject matter, various modifications and changes thereto can be made by persons skilled in the art without departing from the scope and spirit of the invention as defined by the following claims.

What is claimed is:

1. A data storage card having an optical data storage region and a magnetic data storage region, and formed to cooperatively engage with a drive mechanism of a magnetic stripe reader and with a rotatable drive mechanism of an optical data reader, the card comprising:
   a card body defining first and second opposed generally planar surfaces;
   an aperture formed in the card body;
   an annular optical data region centered on the aperture and disposed on or readable from one of the first and second surfaces of the card body;
   a magnetic linear data region disposed on one of the first and second surfaces; and
   a unitary insert structure fabricated of an elastic material, said unitary insert structure disposed in said aperture and configured to engage with a rotatable drive mechanism of the optical data reader in an optical data reading mode, and to engage with the drive mechanism of the magnetic stripe reader in a magnetic data reading mode, said insert structure deformable in a direction transverse to the first and second opposed generally planar surfaces, said deformation of the insert structure in response to engagement of the insert structure with the rotatable drive mechanism of the optical data reader, the insert structure configured to resume or conform to a generally planar condition with the card body after disengagement of the insert structure from the rotatable drive mechanism of the optical data reader.

2. The card of 1, wherein the elastic material is a thermo plastic elastomer or a thermo plastic urethane.

3. The card of claim 1, wherein the card body has a card body thickness of less than 0.96 mm.

4. The card of claim 1, wherein the card body has a card body thickness less than 1.2 mm.

5. The card of claim 1, wherein the aperture has a nominal diameter of 15 mm.

6. The card of claim 1, wherein the aperture has a nominal diameter of 15 mm.

7. A data storage card having an optical data storage region and a magnetic data storage region, and formed to cooperatively engage with a drive mechanism of a magnetic stripe reader and with a rotatable drive mechanism of an optical data reader, the card comprising:
   a card body defining first and second opposed generally planar surfaces;
   an aperture formed in the card body;
   an annular optical data region centered on the aperture and disposed on or readable from one of the first and second surfaces of the card body;
   a magnetic linear data region disposed on one of the first and second surfaces; and
   an insert structure disposed in said aperture configured to engage with a rotatable drive mechanism of the optical data reader in an optical data reading mode, and to engage with the drive mechanism of the magnetic stripe reader in a magnetic data reading mode, said insert structure deformable in a direction transverse to the first and second opposed generally planar surfaces to accommodate the engagement with the rotatable drive mechanism of the optical data reader; and
   wherein the insert structure comprises:
   an outer annular peripheral portion;
   an interior ring portion;
   a plurality of web portions connected between the outer annular peripheral portion and the interior ring portion.

8. The card of claim 7, wherein the plurality of web portions include at least one web portion extending along an area traversed by the rollers of the magnetic stripe reader.

9. The card of claim 8, wherein the at least one web portion includes first and second web portions disposed on opposite sides of the ring portions.

10. The card of claim 7, wherein the card body includes a recessed annular region surrounding the aperture, and said outer peripheral portion of the insert structure is attached to the card body at said recessed annular region.

11. The card of claim 10, wherein said outer peripheral portion of the insert structure is adhesively attached to the card body.

12. The card of claim 7, wherein the aperture in the card body is a generally circular aperture, with a plurality of notches formed in the card body about the aperture, the insert structure positioned radially relative to the aperture such that the notches are aligned with respective ones of the web portions of the insert structure.

13. A data storage card having an optical data storage region and a magnetic data storage region, and formed to cooperatively engage with a drive mechanism of a magnetic stripe reader and with a rotatable drive mechanism of an optical data reader, the card comprising:
a card body defining first and second opposed generally planar surfaces;
an aperture formed in the card body;
an annular optical data region centered on the aperture and disposed on or readable from one of the first and second surfaces of the card body;
a magnetic linear data region disposed on one of the first and second surfaces; and
an insert structure disposed in said aperture configured to engage with a rotatable drive mechanism of the optical data reader in an optical data reading mode, and to engage with the drive mechanism of the magnetic stripe reader in a magnetic data reading mode, said insert structure deformable in a direction transverse to the first and second opposed generally planar surfaces to accommodate the engagement with the rotatable drive mechanism of the optical data reader; and
wherein the annular optical data region is disposed on or readable from the first planar surface, the linear magnetic linear region is disposed on or readable from the second planar surface, the card body includes a recessed annular region surrounding the aperture, and said insert structure is attached to the card body at said recessed annular region.

14. The card of claim 13, wherein the recessed annular region is formed in the first planar surface.

15. The card of claim 13, wherein the recessed annular region is formed in the second planar surface.

16. A data storage card having an optical data storage region and a magnetic data storage region, and adapted to cooperatively engage with a drive mechanism of a magnetic stripe reader in a magnetic data reading mode and with a rotatable drive mechanism of an optical data reader in an optical data reading mode, the card comprising:
a card body defining first and second opposed generally planar surfaces;
an aperture formed in the card body;
an annular optical data region centered on the aperture and disposed on or readable from one of the first and second surfaces of the card body;
a magnetic linear data region disposed on or readable from one of the first and second surfaces;
a recessed region formed in the card body adjacent the aperture and interior of said annular optical data region, said recessed region defining a mounting surface; and
an insert structure disposed in said aperture configured to engage with a rotatable drive mechanism of the optical data reader in an optical data reading mode, and to engage rollers of the magnetic stripe reader in a magnetic data reading mode, said insert structure including an attachment portion attached to the mounting surface of the card body in said recessed region, and wherein the insert structure is a unitary structure fabricated of an elastic material.

17. The card of claim 16, wherein the elastic material is a thermo plastic elastomer or a thermo plastic urethane.

18. The card of claim 16, wherein the recessed region is formed on a side of the card in which the linear magnetic data region is formed or readable from.

19. The card of claim 16, wherein the card body has a card body thickness of less than 0.96 mm.

20. The card of claim 16, wherein the card body has a card body thickness less than 1.2 mm.

21. A data storage card having an optical data storage region and a magnetic data storage region, and adapted to cooperatively engage with a drive mechanism of a magnetic stripe reader in a magnetic data reading mode and with a rotatable drive mechanism of an optical data reader in an optical data reading mode, the card comprising:
a card body defining first and second opposed generally planar surfaces;
an aperture formed in the card body;
an annular optical data region centered on the aperture and disposed on or readable from one of the first and second surfaces of the card body;
a magnetic linear data region disposed on or readable from one of the first and second surfaces;
a recessed region formed in the card body adjacent the aperture, said recessed region defining a mounting surface; and
an insert structure disposed in said aperture configured to engage with a rotatable drive mechanism of the optical data reader in an optical data reading mode, and to engage rollers of the magnetic stripe reader in a magnetic data reading mode, said insert structure including an attachment portion attached to the mounting surface of the card body in said recessed region; and
wherein the insert structure comprises:
an outer annular peripheral portion defining the attachment portion;
an interior ring portion;
a plurality of web portions connected between the outer annular peripheral portion and the interior ring portion.

22. The card of claim 21, wherein the plurality of web portions include at least one web portion extending along an area traversed by the rollers of the magnetic stripe reader.

23. The card of claim 22, wherein the at least one web portion includes first and second web portions disposed on opposite sides of the ring portions.

24. The card of claim 21, wherein said outer peripheral portion of the insert structure is adhesively attached to the card body.

25. A data storage card having an optical data storage region and a magnetic data storage region, and adapted to cooperatively engage with a drive mechanism of a magnetic stripe reader in a magnetic data reading mode and with a rotatable drive mechanism of an optical data reader in an optical data reading mode, the card comprising:
a card body defining first and second opposed generally planar surfaces;
an aperture formed in the card body;
an annular optical data region centered on the aperture and disposed on or readable from one of the first and second surfaces of the card body;
a magnetic linear data region disposed on or readable from one of the first and second surfaces;
a recessed region formed in the card body adjacent the aperture, said recessed region defining a mounting surface; and
an insert structure disposed in said aperture configured to engage with a rotatable drive mechanism of the optical data reader in an optical data reading mode, and to engage rollers of the magnetic stripe reader in a magnetic data reading mode, said insert structure including an attachment portion attached to the mounting surface of the card body in said recessed region; and wherein the recessed region is formed on a side of the card in which the optical data region is formed or readable from, and the aperture in the card body is a generally circular aperture, with a plurality of notches formed in the card body about the aperture, the insert structure positioned radially relative to the aperture such that the notches are aligned with respective web portions of the insert structure.

26. A data storage card having an optical data storage region and a magnetic data storage region, and configured to cooperatively engage both a drive mechanism of a magnetic stripe reader and a rotatable drive mechanism of an optical data reader, the card comprising:
   a) a card body defining first and second opposed generally planar surfaces;
   b) first and second longitudinal edges disposed in spaced opposed relation along the perimeter of the card body;
   c) first and second lateral edges disposed in spaced opposed relation along the perimeter of the card body transverse to the first and second longitudinal edges;
   d) an aperture formed in the card body, the card body having a recessed region of reduced thickness adjacent the aperture;
   e) at least one annular optical data region centered on the aperture and disposed on at least one of the first and second surfaces of the card body outside the recessed region;
   f) at least one magnetic linear data region disposed on at least one of the first and second surfaces;
   g) an insert structure disposed in said aperture, said insert structure a unitary structure fabricated of an elastic material and configured to engage with a rotatable drive mechanism of the optical data reader in an optical data reading mode, and to engage rollers of the magnetic stripe reader in a magnetic data reading mode, said insert structure attached to the card body at said recessed region and having a size such that the total of the thickness of the card body in the recessed region and the thickness of the insert structure do not exceed the thickness of the card body outside the recessed region.

27. An insert structure configured for attachment to a data storage card body including first and second opposed generally planar surfaces and an aperture formed in the card body, the insert structure comprising:
   an attachment portion adapted for attachment to a mounting surface of the card body;
   a structural portion connected to the attachment portion such that with the attachment portion attached to the mounting portion of the card body, the structure portion is disposed in the aperture of the card body and configured to engage with a drive mechanism of a magnetic card reader in which the card body has been inserted, the structure portion deformable in a direction transverse to the first and second opposed generally planar surfaces in response to engagement of the structure portion with a rotatable drive mechanism of an optical data reader in which the card body has been inserted;
   and wherein the attachment portion and the structure portion are integrally formed as a one-piece structure and fabricated from an elastic material.

28. An insert structure configured for attachment to a data storage card body including first and second opposed generally planar surfaces and an aperture formed in the card body, the insert structure comprising:
   an attachment portion adapted for attachment to a mounting surface of the card body;
   a structural portion connected to the attachment portion such that with the attachment portion attached to the mounting portion of the card body, the structure portion is disposed in the aperture of the card body and configured to engage with a drive mechanism of a magnetic card reader in which the card body has been inserted, the structure portion deformable in a direction transverse to the first and second opposed generally planar surfaces to accommodate the engagement with a rotatable drive mechanism of an optical data reader in which the card body has been inserted;
   wherein the attachment portion and the structure portion are integrally formed as a one-piece structure; and
   wherein:
   the attachment portion is an outer annular peripheral portion; and
   the structural portion includes an interior ring portion and a plurality of web portions connected between the outer annular peripheral portion and the interior ring portion.

* * * * *